US005546309A

United States Patent [19]
Johnson et al.

[11] Patent Number: 5,546,309
[45] Date of Patent: Aug. 13, 1996

[54] APPARATUS AND METHOD FOR AUTONOMOUS SATELLITE ATTITUDE SENSING

[75] Inventors: William M. Johnson, Sudbury; Howard Musoff, Brookline, both of Mass.

[73] Assignee: The Charles Stark Draper Laboratory, Inc., Cambridge, Mass.

[21] Appl. No.: 139,935

[22] Filed: Oct. 20, 1993

[51] Int. Cl.$^6$ .................................................. G06F 165/00
[52] U.S. Cl. ........................... 364/434; 364/459; 342/357; 244/164; 244/171
[58] Field of Search ..................................... 364/434, 459; 342/357, 358; 244/164, 171

[56] References Cited

U.S. PATENT DOCUMENTS

| | | | |
|---|---|---|---|
| 4,521,855 | 6/1985 | Lehner et al. | 364/434 |
| 4,617,634 | 10/1986 | Izumida et al. | 244/164 |
| 4,728,061 | 3/1988 | Johnson et al. | 244/164 |
| 4,754,280 | 6/1988 | Brown et al. | 342/357 |
| 4,786,018 | 11/1988 | Cope | 244/171 |
| 4,807,835 | 2/1989 | Fowler | 244/166 |
| 4,837,699 | 6/1989 | Smay et al. | 364/459 |
| 4,883,244 | 11/1989 | Challoner et al. | 364/459 |
| 4,944,587 | 7/1990 | Harigae | 356/152 |
| 5,020,744 | 6/1991 | Schwarzchild | 244/164 |
| 5,062,051 | 10/1991 | Sainct et al. | 364/459 |
| 5,109,346 | 4/1992 | Wertz | 364/459 |
| 5,412,574 | 5/1995 | Bender et al. | 244/164 |

OTHER PUBLICATIONS

Proprietary Document: Article, Title: "Space Based Precision Pointing System Using Pseudo Star Reference", Luniewicz, Woodbury, Gilmore, Chien, The Charles Stark Draper Laboratory, Inc., 555 Technology Square, Cambridge, Massachusetts 02139, (17 pages), Presented at the 49th Annual Meeting of The Institute of Navigation, Jun. 21–23, 1993.

Proprietary Document: Article, Title: "Inertial Pseudo–Star Reference Unit (IPSRU)", Gilmore, Chien, The Charles Stark Draper Laboratory, Inc., Wingler, Phillips Laboratory, (9 pages) Sponsored by IEEE Aerospace and Electronics Systems Society Monterey, California, Mar. 23–27, 1992.

*Primary Examiner*—Gary Chin
*Attorney, Agent, or Firm*—Weingarten, Schurgin, Gagnebin & Hayes

[57] ABSTRACT

An attitude sensing system utilizing simplified techniques and apparatus includes a Kalman filter which receives signals from an inertial measurement unit, a GPS receiver, and an integrated optical assembly. The output vector of the filter includes estimates of attitude misalignments and estimates of gyro drifts corresponding to the axes of the inertial measurement unit. The optical assembly includes a sensor array providing signals to the filter representing detection of the Earth's horizon or the center of the Sun. More particularly, a local vertical vector, computed from fore and aft detections of the Earth's horizon, is used in combination with GPS received signals to initially determine attitude by means of gyrocompassing. This attitude information is thereafter maintained by the inertial measurement unit and azimuth error resulting from drift of the inertial measurement unit and the initial gyrocompassing error is corrected by detections of the Earth's horizon and the Sun. The integrated optical assembly, used to detect the locations of both the Sun and Earth relative to the satellite, eliminates a need for separate apparatus dedicated to each sensing function. Moreover, the GPS receiver eliminates the need for ground tracking apparatus by providing the satellite ephemerides (including orbital pitch rate used in gyrocompassing) for use by the filter, rendering the attitude sensing system substantially autonomous. Additionally, the GPS receiver, in combination with the Sun and Earth detections, eliminates the need for a complex star tracker by providing an accurate inertial frame of reference.

13 Claims, 9 Drawing Sheets

APPARATUS AND METHOD FOR AUTONOMOUS SATELLITE ATTITUDE SENSING

FIELD OF THE INVENTION

This invention relates generally to spacecraft attitude sensing and, more particularly, to simplified apparatus and methods for determining, updating, and calibrating satellite attitude information.

BACKGROUND OF THE INVENTION

As is known in the art, it is often desirable to determine the attitude of a spacecraft for payload pointing purposes. Attitude refers to angular orientation with respect to three orthogonal axes. Satellites typically employ attitude sensing apparatus for pointing a payload such as a telescope or antenna to a desired location on the Earth. Conventional attitude sensing apparatus may include a satellite receiver, such as a Global Positioning System (GPS), ground tracking apparatus for locating the satellite ephemerides, and a star tracker for transforming latitude, longitude, and altitude information determined in terms of spacecraft coordinates into a stellar, or orbital frame of reference.

In one satellite attitude sensing system described in U.S. Pat. No. 4,754,280, an array of three satellite receiving antennae are used to sense the attitude of a satellite in accordance with interferometry techniques. A Kalman filter receives the interferometric signals and signals from an inertial measurement unit, generally comprising gyroscopes, and provides periodic optimal estimates of attitude and error rate parameters for each of the gyroscopes. The error rate parameters are used to calibrate the inertial measurement unit output signals in order to compensate for the long term drift associated therewith.

In another attitude sensing system described in U.S. Pat. No. 5,109,346, satellite attitude information is determined by sensing the locations of any two of the Earth, Sun, and Moon. For example, the angular positions of the Sun and Moon with respect to the satellite are measured and are also estimated from ephemeris data. Satellite attitude with respect to a geocentric inertial reference frame is then calculated from the measured and estimated angular positions. In the system described therein, an inertial measurement unit, comprising three orthogonally oriented gyroscopes, is used to update the satellite attitude.

SUMMARY OF THE INVENTION

In accordance with the present invention, apparatus and techniques are provided for sensing, updating, and calibrating the attitude of a spacecraft, such as a satellite. The apparatus includes a satellite receiver, such as a GPS receiver, and an optimal estimator filter, such as a digital Kalman filter. The GPS receiver locates the satellite ephemerides for use by the digital filter, thereby eliminating the need for ground tracking apparatus. The need for a complex star tracker is eliminated by the combination of the GPS receiver and Sun and Earth detections which provides a stellar (i.e. inertial) reference frame.

More particularly, the attitude sensing system of the invention includes a GPS receiver providing receiver output signals, an inertial measurement unit providing a direction cosine matrix representing the attitude of the satellite axes relative to the inertial reference frame, and an optical sensor array providing output signals representing an image focused thereon in response to detections of the Earth or Sun. The digital filter receives the GPS signals, the inertial measurement unit direction cosine matrix, and the sensor array output signals and provides a multi-dimensional state vector output including small attitude misalignment angles for correction of the direction cosine matrix and a set of gyro drift estimates for correcting the gyro drifts.

The sensor array output signals represent detections of the Earth's horizon or the center of the Sun. Displacement of the satellite boresight body axis from the true local vertical vector is computed from fore and aft detections of the Earth's horizon. The GPS signals are used to determine the satellite ephemerides and hence its orbital rate which, in conjunction with the gyros, is used to determine roll and yaw displacements through gyrocompassing. Thereafter, the attitude information is updated by the inertial measurement unit, which accurately tracks satellite positional changes at substantial rates, but is subject to drift over time causing long term error. The attitude information is periodically corrected, or calibrated by detections of the Sun in order to compensate for the effects of long term drift experienced by the inertial measurement unit.

The optical assembly includes common apparatus for detecting both the Sun and Earth, thereby eliminating the need for separate sensing apparatus dedicated to each detection type. The assembly includes a moveable scanning mirror and Cassegranian arranged primary and secondary mirrors for focusing incident images onto the sensor array. The integrated optical assembly also includes an image stabilizing light source mounted on an intertially stabilized platform for stabilizing the viewed scene. With this arrangement, relatively simple and compact apparatus having a minimum number of components, and associated methods having a minimum number of steps, enable accurate and relatively low-cost satellite attitude sensing and updating.

BRIEF DESCRIPTION OF THE DRAWINGS

The foregoing features of this invention, as well as the invention itself, may be more fully understood from the following detailed description of the invention in which.

DESCRIPTION OF THE PREFERRED EMBODIMENT

Figure 1:
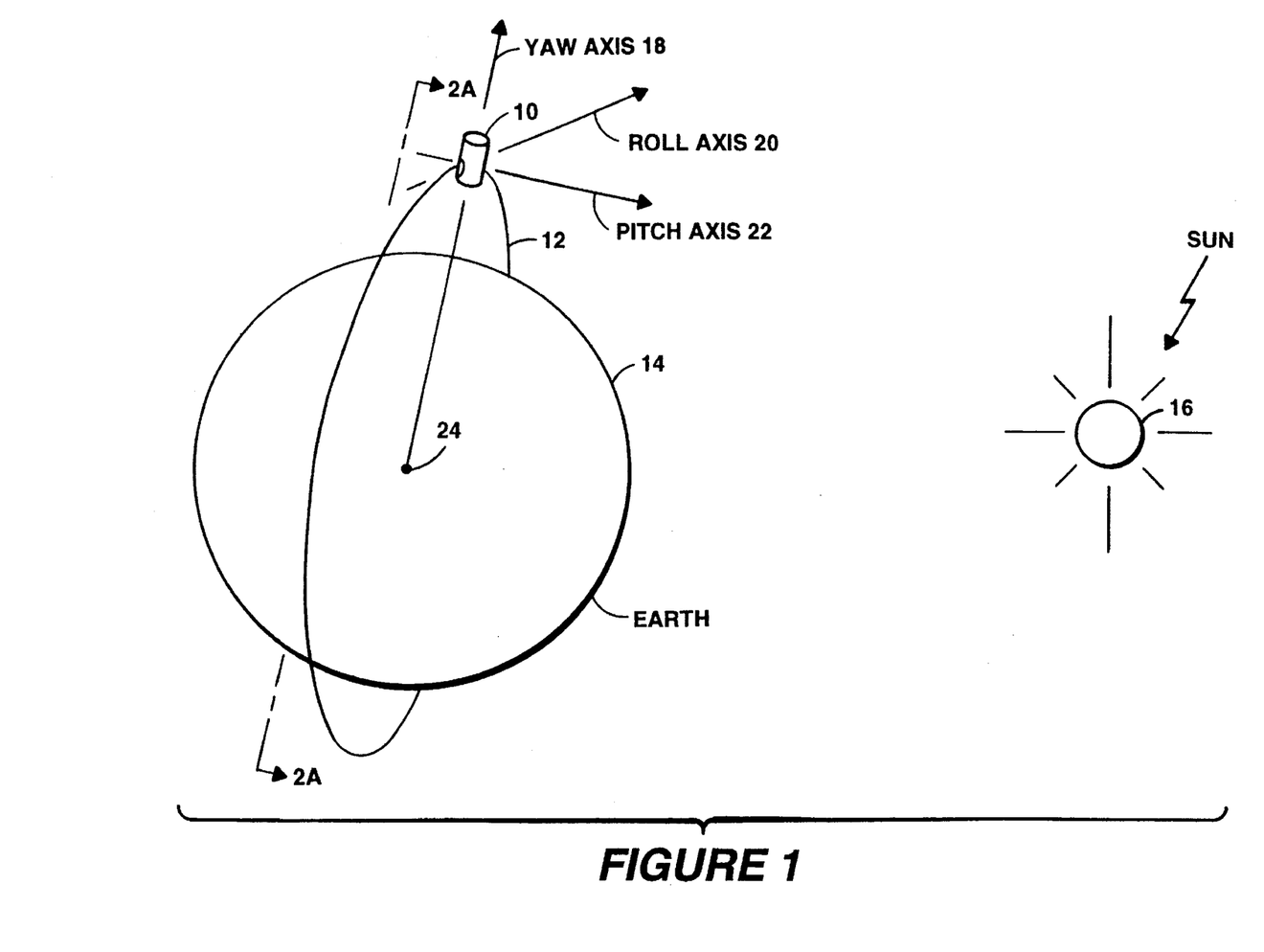
FIG. 1 is a diagrammatic representation of a satellite at an exemplary location relative to the Earth and Sun.

Referring to FIG. 1, a spacecraft (referred to hereinafter as satellite 10) is shown in an orbit 12 around the Earth 14.

Three mutually orthogonal axes, labelled yaw axis 18, roll axis 20, and pitch axis 22, define a spacecraft frame of reference. The yaw axis 18 is coincident with the boresight of the satellite 10. The roll axis 20 is tangential to the orbit 12 in which the satellite 10 travels and the pitch axis 22 is orthogonal to the plane of the orbit 12. The illustrated orbit 12 is a Sun-synchronous orbit, as is characterized by the line of sight of the satellite 10 to the Sun 16 being coincident with the pitch axis 22. Alternatively, the satellite 10 may travel in a polar orbit. Satellite 10 includes apparatus 30 (FIG. 4) for determining its attitude and for calibrating such attitude in order to continuously provide accurate attitude information. More particularly, attitude refers to the angular orientation of the vessel or spacecraft with respect to three orthogonal reference axes. The sensed attitude represents satellite angular orientation relative to the spacecraft frame of reference defined by the yaw axis 18, the roll axis 20, and the pitch axis 22. It is generally desirable to know the attitude of the satellite 10 with respect to an orbital frame of reference, by means of a direction cosine matrix which embodies the relation between the satellite body frame and the orbital reference frame. A stellar (i.e. inertial) frame of reference is easily related to the orbital reference frame through ephemerides of the satellite and Earth. In the case where the satellite axes 18, 20, 22 are perfectly aligned with the orbital frame of reference, the pitch axis 22 of the satellite 10 experiences the full orbital rate.

Figure 2A:
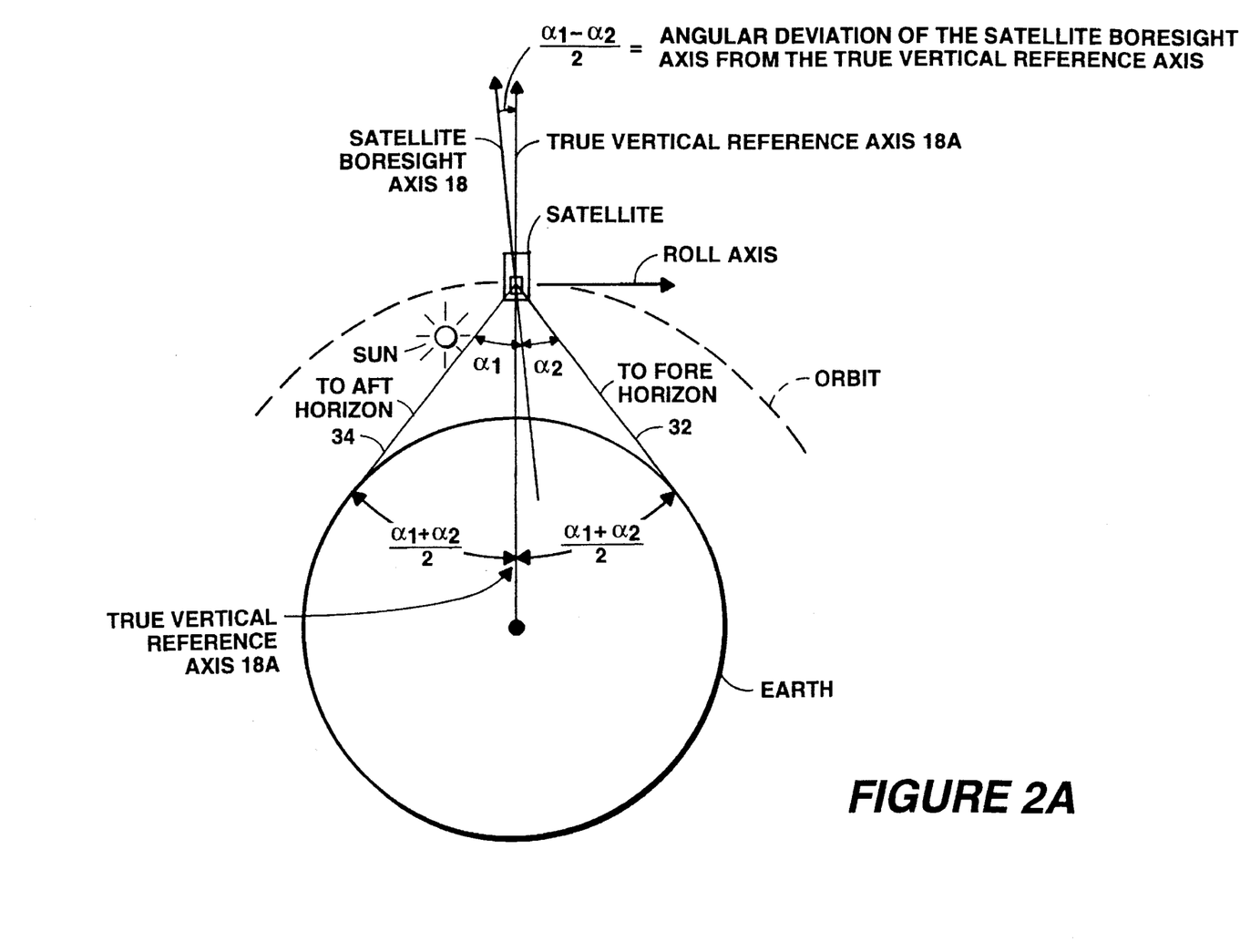
FIG. 2A is a diagrammatic representation of the satellite of FIG. 1 taken along line 2A—2A of FIG. 1.

Referring now to FIG. 2A, a plan view of the satellite 10 along line 2A—2A of FIG. 1 is shown. The yaw axis 18 ideally extends from the satellite 10 to the center 24 of the Earth 14 and more particularly, points along nadir. Also shown are vectors 32, 34 pointing to the Earth's horizon, fore and aft of the satellite 10, respectively. Angles $\alpha_1$, $\alpha_2$ are measured angles between the yaw axis 18 and the fore and aft Earth horizon detections, respectively. Detection of the Earth's horizon is used to initially determine the angular deviation of the satellite boresight or yaw axis from the true nadir (or vertical) axis. To this end, the angle $\alpha_1+\alpha_2$ is measured. The angle between the true vertical reference axis 18A and the horizon detection vectors 32, 34 can be computed by dividing the measured summation angle $\alpha_1+\alpha_2$ by two. The angular deviation between the satellite boresight axis and the true vertical axis 18A is therefore given by:

$$\alpha_1 - \frac{(\alpha_1 + \alpha_2)}{2} = \frac{\alpha_1 - \alpha_2}{2}$$

Figure 2B:
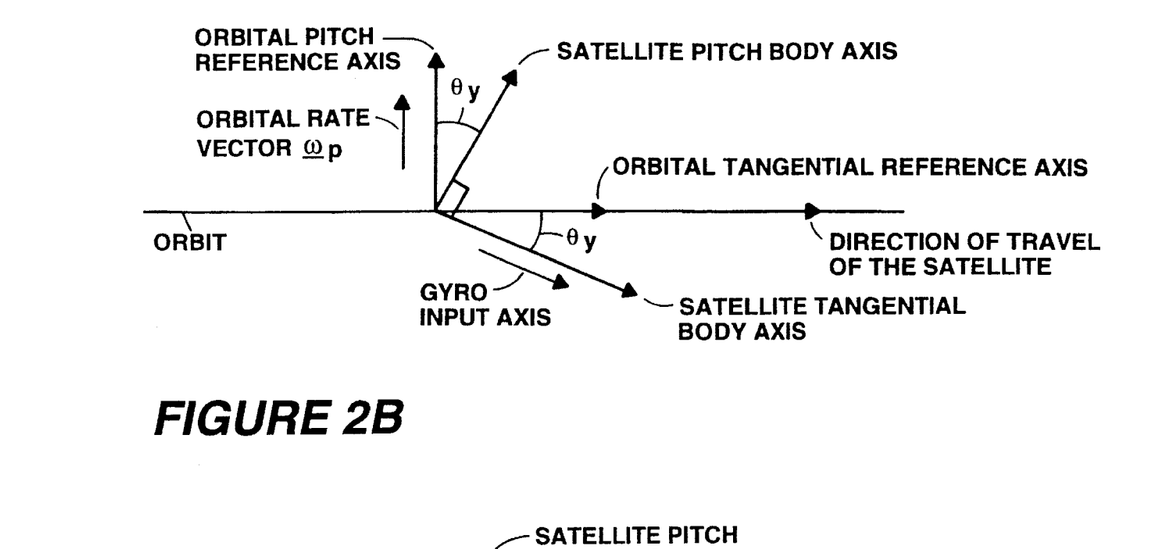
FIG. 2B is a top view of axes associated with a satellite looking down the nadir axis toward Earth.

Gyrocompassing is used to determine the small angular deviation of the satellite pitch body axis from the orbital reference frame pitch axis. FIG. 2B shows a top view of the satellite looking down the nadir axis toward Earth in which $\Theta_y$=small angular displacement between satellite and orbital pitch axes about the yaw axis.

The magnitude of the orbital rate vector $\omega_A|\omega_p|$ is readily determined from satellite ephemeris knowledge obtained via the GPS. A gyro whose input axis is parallel to the satellite tangential body axis, as shown in FIG. 2B, measures, in the absence of gyro drift, a rate $\omega_{gt}$ given by $\omega_{gt}=-\Theta_y\omega_p$ for a small angle θ. Hence, we can determine $\Theta_y$ from $$\Theta_y = \frac{-\omega_{gt}}{\omega_p}$$

and thus obtain the small misalignment angle $\Theta_y$ (about the yaw axis) between the satellite body pitch axis and the orbital pitch axis.

Figure 2C:
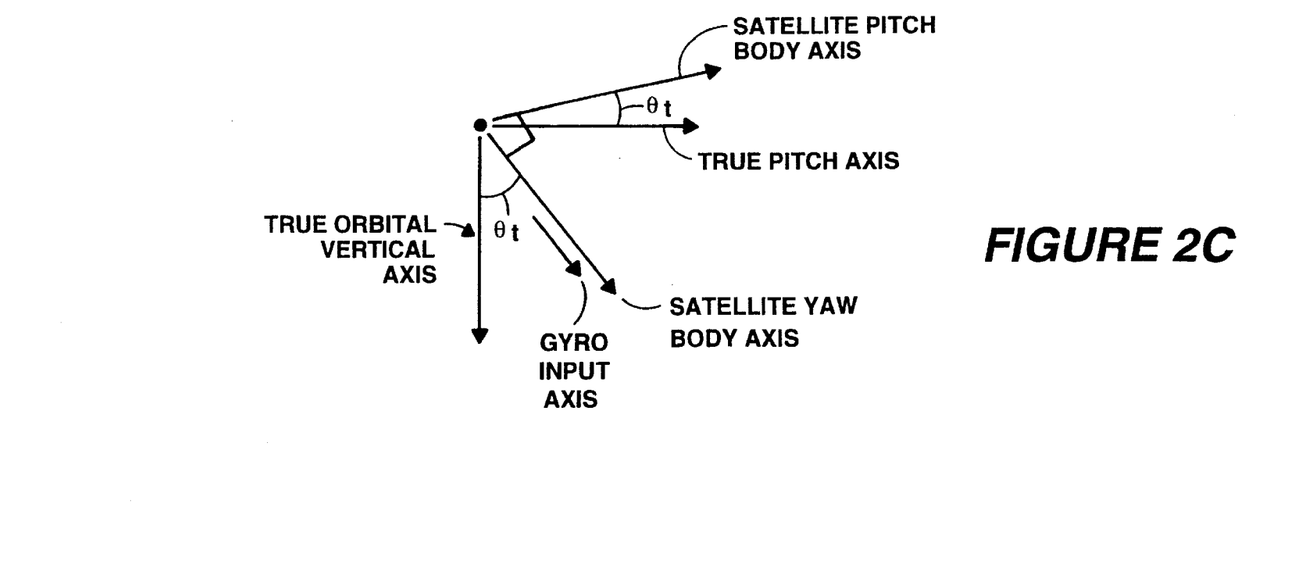
FIG. 2C is a frontal view of axes associated with an oncoming satellite.

This misalignment angle is one of two that is determined through gyrocompassing. The second misalignment angle is that of the small angular displacement $\Theta_t$ about the tangential axis that measures the small out of orbital plane angular displacement between the satellite yaw body axis and the orbital vertical axis. Referring to FIG. 2C, a frontal view of an oncoming satellite is shown. The gyro whose input axis is parallel to the satellite yaw body axis measures, in the absence of gyro drift, $\omega_{gv}=\Theta_t\omega_p$ for a small angle $\Theta_t$. Hence, $\Theta_t$ can be obtained from the gyro output $\omega_{gv}$ and the orbital rate knowledge $\omega_p$ as follows $$\Theta_t = \frac{\omega_{gv}}{\omega_p}.$$

The two misalignment angles $\Theta_y$ and $\Theta_t$ obtained from gyrocompassing along with the vertical misalignment angle $$\frac{\alpha_1 - \alpha_2}{2}$$

obtained from the horizon sensors suffice to determine the initial attitude of the satellite with respect to the orbital reference frame.

Figure 3:
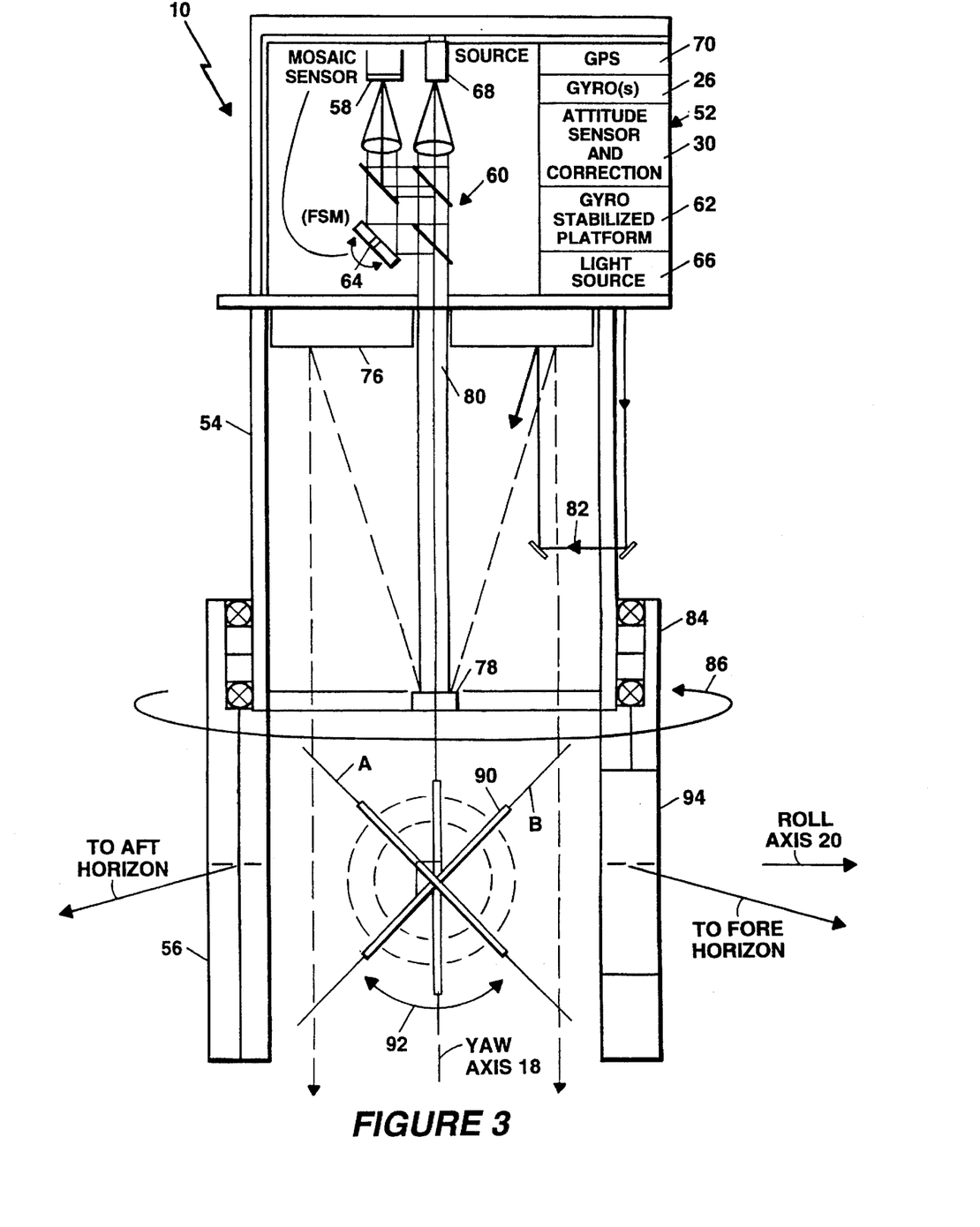
FIG. 3 is a cross-sectional diagram of a satellite in accordance with the invention.

Features of the satellite attitude sensing system will become more apparent by referring now to the satellite 10 of FIG. 3 which includes a sensor housing 52, a telescope portion 54, and a rotating portion 56. Together the sensor housing 52, the telescope portion 54, and the rotating portion 56 comprise an integrated optical assembly 50 adapted for sensing the Earth's horizon, as noted above, as well as the center of the Sun. The sensor housing 52 houses an attitude sensing and correcting processor 30, a mosaic sensor array 58, a mirror arrangement 60, and an inertially stabilized platform 62. More particularly, the platform 62 is stabilized by gyroscopes 26, such as a three degree of freedom inertial measurement unit, and preferably has an image stabilizing light source 66 providing a light beam 82 mounted thereon. The optional image stabilization provided by light source 66 will be described in greater detail below in conjunction with FIG. 5. Suffice it here to say that the difference between a reference location of the light beam 82 on the sensor array 58 and a measured location of the light beam 82 on the array 58 is used to control a fast steering mirror 64 to stabilize the viewed scene. One type of gyro stabilized platform 62 is the Inertial Pseudo Star Reference Unit (IPSRU) of the Charles Stark Draper Laboratory, Inc., Cambridge, Mass. Additional processing electronics disposed in the sensor housing 52 include GPS receiver 70.

The gyroscopes 26 measure rotational rates experienced by the satellite 10 relative to the spacecraft frame of reference. These gyroscopes are used to update, or maintain, the attitude information and are capable of accurately tracking spacecraft maneuvering at substantial rates. However, such gyroscopes 26 are susceptible to drift over time, resulting in error in the sensed rotational rates and thus, in the resulting attitude information.

Attitude sensing and correction processor 30 periodically calibrates the attitude information in order to overcome errors attributable to the long term drift of the inertial measurement unit 26 as well as initial gyrocompassing errors, in a manner described below. Suffice it here to say that the processor 30, and associated methods described hereinafter, are advantageously suited for long term error correction or compensation; whereas, the inertial measurement unit 26 is well suited for tracking rapid dynamic rotational effects. The attitude sensing and correction processor 30 includes a digital Kalman filter (FIG. 4) for optimizing long term performance by periodically calibrating the satellite attitude information using Earth's horizon and Sun measurements.

The telescope portion 54 of satellite 10 has a Cassegranian arrangement which includes a primary mirror 76 having a central aperture 80 and a secondary mirror 78 which focuses the image within the field of view of the satellite onto the sensor array 58, as is conventional. More particularly, telescope portion 54 compresses the image incident on the primary mirror 76 to focus such image onto the sensor array 58. In addition to conventional images from the field of view being focused onto the sensor array 58, an alignment light source 68 provides a beam of light which is focused on the sensor array 58 by mirror 60. Alignment laser source 68 is aligned with the boresight of the satellite 10 and is used to register, or align, the mirror 60 to properly focus images on the sensor array 58.

The rotating portion 56 of the satellite 10 is coupled to telescope portion 54 by any suitable means, such as bearing 84, so that the portion 56 is rotatable, as shown by arrow 86. Rotating portion 56 has a telescope entrance aperture 92, disposed at the end of the longitudinal axis of the satellite 10, distant from the sensor housing 52, and defining the field of view of the satellite. A window 94 is provided in the rotating portion 56, orthogonal with respect to the telescope entrance aperture 92, as shown. With this arrangement, the telescope entrance aperture 92 defines the vertical line of sight of the satellite 10 coincident with the boresight, whereas the window 94 defines an azimuth line of sight thereof.

Scan mirror 90 is rotatably positioned within the rotating portion 56 of the satellite 10 so that, in operation, mirror 90 is rotated, as shown by arrow 92, to scan a desired scene. More particularly, mirror 90 focuses the images of a particular scene onto the mosaic sensor array 58, as is conventional. For example, when viewing the nadir scene, the mirror 90 is positioned parallel to the longitudinal axis of the satellite 10 and coincident with the yaw axis 18; whereas, when sensing the Earth's horizon, the scan mirror 90 is either in position A or B, depending on whether the horizon is being sensed fore or aft of the satellite 10. Note that satellite 10 is shown without typical mission specific apparatus attached thereto, such as reaction wheels, and solar panels, for simplicity.

In operation, the attitude of the satellite 10 is initially sensed, or detected, with the use of signals received by the GPS receiver 70 to determine orbital rate for gyrocompassing and the horizon detections referred to above in conjunction with FIG. 2A. The attitude determined through the horizon sensing and gyrocompassing as above is maintained, or continuously updated, by the inertial measurement unit 26. That is, the strap-down gyroscopes 26 measure the rotational rates of the satellite 10 with respect to the three mutually orthogonal axes 18, 20, 22 and provide a direction cosine matrix computed from sensed rates. While gyroscopes 26 provide suitable means of updating the attitude of the satellite 10 between successive determinations, such inertial measurement units 26 are susceptible to drift over time. In the present invention, the attitude information maintained, or stored, by the gyroscopes 26 is periodically calibrated, or corrected in order to compensate for gyroscopic introduced errors.

Figure 4:
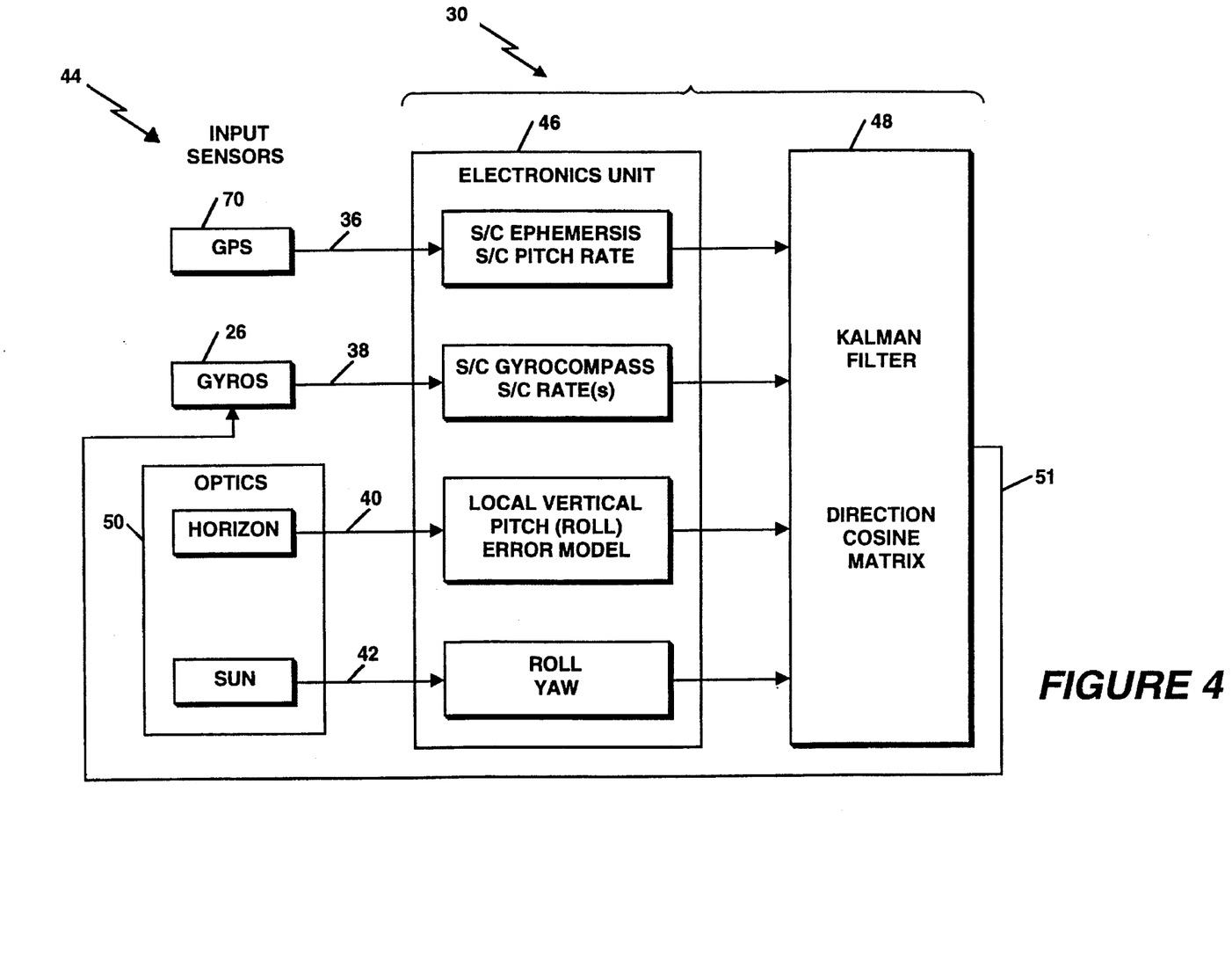
FIG. 4 is block diagram of the attitude sensing apparatus in accordance with the present invention.

Referring now to FIG. 4, a simplified block diagram of the processing apparatus 30 for detecting and correcting satellite attitude information is shown. Inputs to the apparatus 30 are provided by various sensors 44 including the GPS receiver 70 providing position signals 36 indicative of the latitude, longitude, and altitude of the satellite 10 relative to Earth 14, the inertial measurement unit 26 providing gyroscopic rate sensing output signals 38 or attitude vector 38, and the integrated optical assembly 50 providing Earth horizon detection signals 40 and Sun detection signals 42. More particularly, optical assembly 50 detects the location of the Earth's horizon for use in determining attitude as described above, as well as to calibrate the attitude information with respect to the pitch axis 22 as will be described below. Additionally, optical assembly 50 detects the location of the center of the Sun 16 in order to calibrate the attitude information with respect to the roll axis 20 and yaw axis 18, such as may result from long term drift of the gyroscopes 26. While signals 40, 42 are shown separately in FIG. 4, it should be appreciated from the above discussion of FIG. 3 that both such signals are successively provided by the sensor array 58 to processing apparatus 30.

Input signals 36–42 are coupled to the attitude sensing and correcting processor 30 and more particularly, to an electronics unit 46, the outputs of which are coupled to Kalman filter 48 for further processing. The implementation of Kalman filter 48 will be described in greater detail below in conjunction with FIG. 8. Suffice it here to say however, that filter 48 periodically provides an optimal estimate of gyro drifts to the gyros 26 via feedback signal 51 in order to compensate for errors in the attitude information caused by the inertial measurement unit 26. Kalman filter 48 further provides an alignment command vector, or feedback signal 134 (FIG. 8) to adjust the direction cosine matrix computed from the gyroscope output signals.

The GPS information locates the ephemerides associated with the satellite 10. The satellite ephemeride information is used to determine the location of the Sun 16 relative to the satellite 10, and to determine the rate of satellite orbit about the pitch axis 22, as described below. The gyroscopes 26 provide rate sensing output signals which are used to compute the satellite attitude direction cosine matrix. As mentioned above, optical assembly 50 is used to determine the local vertical vector. Additionally, the horizon detections are used to calibrate attitude relative to the pitch axis 22, as described below in conjunction with FIGS. 5 and 7. Detection of the Sun 16 is used to calibrate attitude relative to the roll axis 20 and the yaw axis 18. Inputs to the Kalman filter 48 are provided by the electronics unit 46 and will be discussed in greater detail below in conjunction with FIG. 8.

Figure 5:
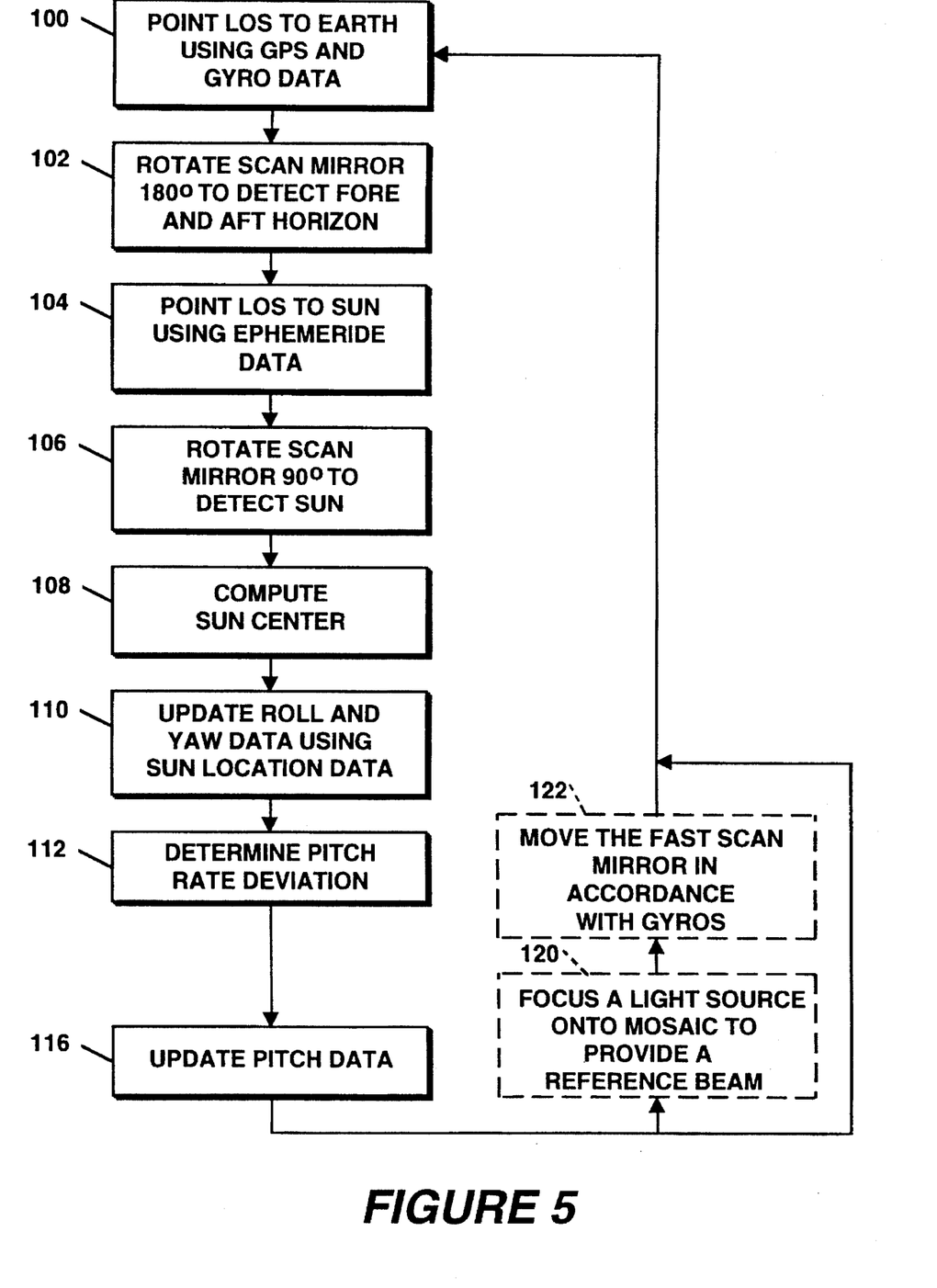
FIG. 5 is a flow diagram of an attitude sensing process in accordance with the present invention.

Referring now to FIG. 5, an illustrative process for correcting the satellite attitude direction cosine matrix provided by inertial measurement unit 26 in accordance with the apparatus 30 of FIG. 4 is shown. In step 100, the satellite line of sight coincident with the boresight of the satellite 10 is pointed toward the Earth 14 by commanding the satellite to have the proper attitude as measured by the direction cosine matrix. Note that the direction cosine matrix provides the relationship between the satellite body axes and the orbital frame references. Knowing the orbital reference frame provides knowledge of the vertical direction toward the Earth. The scan mirror 90 is then rotated to detect the Earth's horizon both fore and aft of the satellite 10 through the window 94 in process step 102. More specifically, the fore horizon detection is obtained when the scan mirror 90 is in position A (FIG. 3) and the aft horizon detection is obtained when mirror 90 is rotated 180° to position B (FIG. 3). From the two horizon detections, the local vertical vector is determined, as above. That is, the local vertical is computed by dividing the measured sum of the angles $\alpha_1$, $\alpha_2$ by two. As discussed above, the local vertical vector provides a determination of the error of the detected attitude with respect to the pitch axis 22.

Thereafter, in steps 104–108, the location of the Sun 16 is detected and used to update the attitude information in terms of errors with respect to the roll axis 20 and the yaw axis 18.

Detecting the location of the Sun 16 is not suitable for updating the attitude with respect to the pitch axis 22 when the satellite is travelling in a Sun-synchronous orbit 12 since the angle to the Sun 16 is approximately parallel to the pitch axis 22. On the other hand, error between the measured and desired roll and yaw axes is readily observable with detection of the Sun 16. Note however that the pitch angle can be made observable from detection of the Sun 16 by maneuvering the satellite 10 about the yaw axis 18. In step 104, the window 94 (FIG. 3) is pointed toward the Sun 16.

To this end, the approximate location of the Sun 16 is provided by ephemeride data obtained from the GPS received signals 36 and stored in a storage device of the electronics unit 46 (FIG. 4). That is, GPS signals 36 indicate the position of the satellite 10 relative to the Earth 14, and stored ephemeride tables indicate the position of the Sun 16 relative to the Earth 14 at any given time. With this information, the position of the satellite 10 relative to the Sun 16 is ascertained. With the window 94 of the satellite 10 pointing toward the Sun 16, the scan mirror 90 is rotated 90° in process step 106, in order to detect the center of the Sun 16. More particularly, in step 108, a Sun detection process, or algorithm, is performed.

Figure 6:
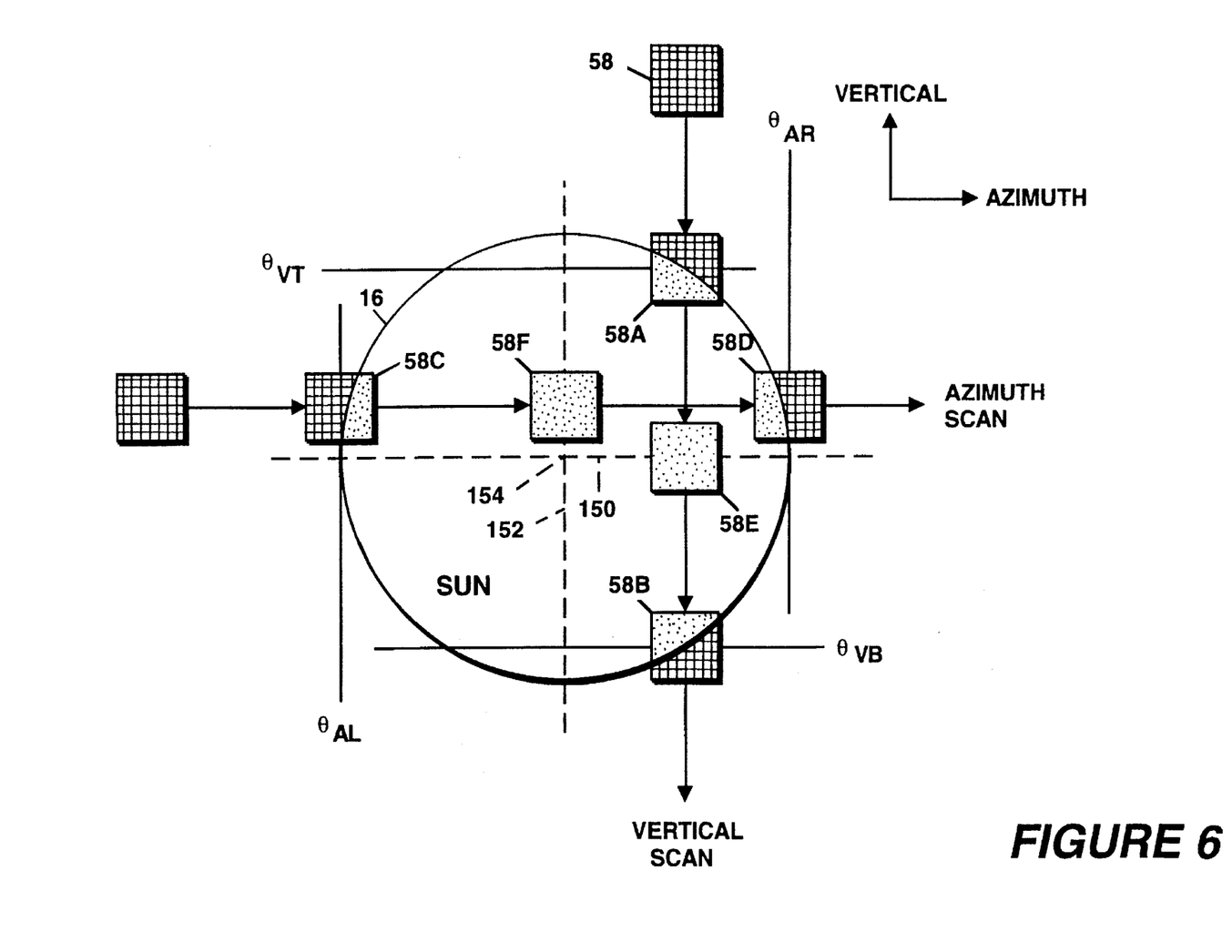
FIG. 6 is a diagram illustrating the detection of the center of the Sun.

Referring to FIG. 6, a process for detecting the location of the center of the Sun 16 will be described. When the scan mirror 90 is rotated to perform a vertical scan, the sensor array 58 crosses the perimeter of the Sun 16 twice; for example, at locations 58A and 58B. Similarly, when the window 94 is rotated to perform an azimuth scan, the perimeter of the Sun 16 is crossed twice, such as at locations 58C and 58D. In response to the two vertical scan Sun crossings 58A and 58B, the electronics unit 46 computes the midpoint therebetween to provide location 58E. Likewise, in response to the two azimuth scan Sun crossings 58C and 58D, the electronics unit 46 computes the midpoint therebetween to provide location 58F. Thereafter, an azimuth axis 150, passing through location 58E, and a vertical axis 152, passing through location 58F, are ascertained. The location of the intersection of axes 150, 152, labelled 154, represents the location of the center of the Sun 16. More particularly, it is the intersection of the two lines that are each perpendicular to the respective segments defined by the azimuth and vertical scans.

Once the center of the Sun 16 is detected, the roll and yaw data is corrected in process step 110 with the use of Kalman filter 48, as will be described in conjunction with FIG. 8. Suffice it here to say that the detection of the center of the Sun 16 provides a reference for the attitude of the satellite with respect to the roll axis 20 and yaw axis 18. An alternative to the procedure of FIG. 6 for determining the Sun center, and exclusive to the invention claimed herein, is the use of the universal limb measurement described below. This "reference" information is compared to the attitude of the satellite with respect to the roll and yaw axes as measured by the inertial measurement unit 26 to update the attitude with respect to the roll axis 20 and yaw axis 18 in step 110. That is, the direction cosine matrix maintained by the gyros 26 can be used to predict where the Sun center is relative to the satellite in conjunction with the GPS determined ephemerides of the satellite. This prediction of the location of the Sun center is then directly compared with the Sun center measurement described above to compensate for attitude errors with respect to the roll and yaw axes due to gyroscope drift.

Thereafter in process step 112, the pitch axis attitude information is calibrated. The error in the gyroscope measured pitch attitude information is attributable not only to gyroscope drift but also to errors resulting from the horizon detection. That is, the method described above for measuring the attitude information with the use of Earth horizon sensing in combination with GPS received signals is susceptible to systematic, non-constant errors, such as may be caused by certain atmospheric conditions.

In accordance with a technique for correcting pitch attitude information, an oblate Earth model is compared to the local vertical vector determined by the horizon detections, as above. The GPS signals are used as inputs to the oblate Earth model for a hypothetical pitch gyroscope strapped to the true local vertical axis. The difference between the GPS oblate Earth model vertical and the horizon computed local vertical vector is computed to provide a pitch rate deviation.

More particularly, consider a model of the Earth as an oblate spheroid (flattened sphere) and a perfect circular orbit around this oblate spheroid. A GPS position signal can provide a direction from the satellite to the "center" of the oblate spheroid at any point in time. The fore and aft horizon measurements also provide a "vertical" that will not in general agree with the "vertical" to the center of the oblate spheroid. The deviation between these two measurements of vertical can be modeled. For example, near the poles and equator, the deviations on the vertical measurements are zero (due to symmetry).

Figure 7:
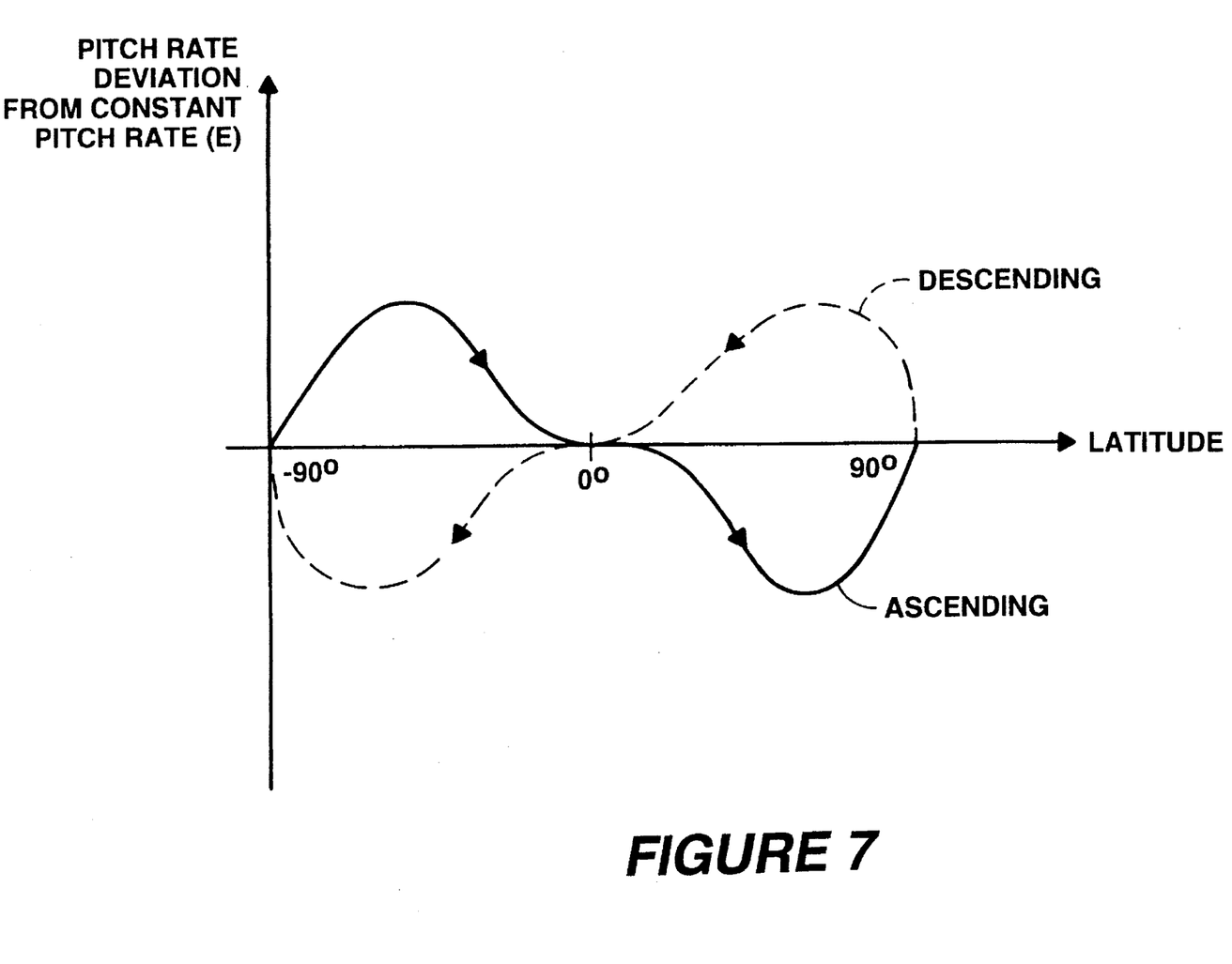
FIG. 7 is a graph showing the pitch rate deviation as a function of latitude.

If the Earth were perfectly spherical and the orbit circular, the pitch gyro would measure a constant orbital rate (4 degrees per minute). In fact, the pitch gyro will not have a constant output due to the effect of the oblate Earth. However this small deviation can be well-characterized and the resulting pitch gyro deviation from a constant pitch rate (4 degrees per minute) can be plotted as a function of latitude, as shown in FIG. 7. The relationship between latitude and pitch rate deviation from constant pitch rate of FIG. 7 is stored in a look-up table. Since the GPS position signal provides latitude, the exact pitch rate can be determined by using the GPS position signal as an input to the look-up table representing the relationship of FIG. 7. The pitch rate deviation thus determined is used to correct the pitch gyro measured rate in step 116.

An optional technique for stabilizing the viewed scene, or image focused on the sensor array 58, is provided in process steps 120 and 122. More particularly, scene stabilization is achieved with the use of the light source 66 mounted on the gyro stabilized platform 62 mentioned above in conjunction with FIG. 3. In operation, a reference light beam 82 provided by the light source 66 is focused on the sensor array 58 for purposes of stabilizing the viewed scene. More particularly, in process step 120, the reference light beam 82 is focused on the sensor array 58 to provide a reference location on the array. Since the light source 66 is inertially stabilized, any high frequency rotational rates experienced by the satellite 10 are not concomitantly experienced by the reference light beam 82; whereas the array 58 does experience the rotational rates to which the satellite 10 is subjected. The processor 30 includes means for measuring the difference in the locations on the sensor array 58 of the reference location of light beam 82 and the location of the light beam 82 during operation of the satellite 10. In process step 122, the fast steering mirror 64 is rotated in accordance with the positional difference signal. With this arrangement, the image within the satellite's field of view is stabilized against high frequency motion of the satellite 10.

Figure 8:
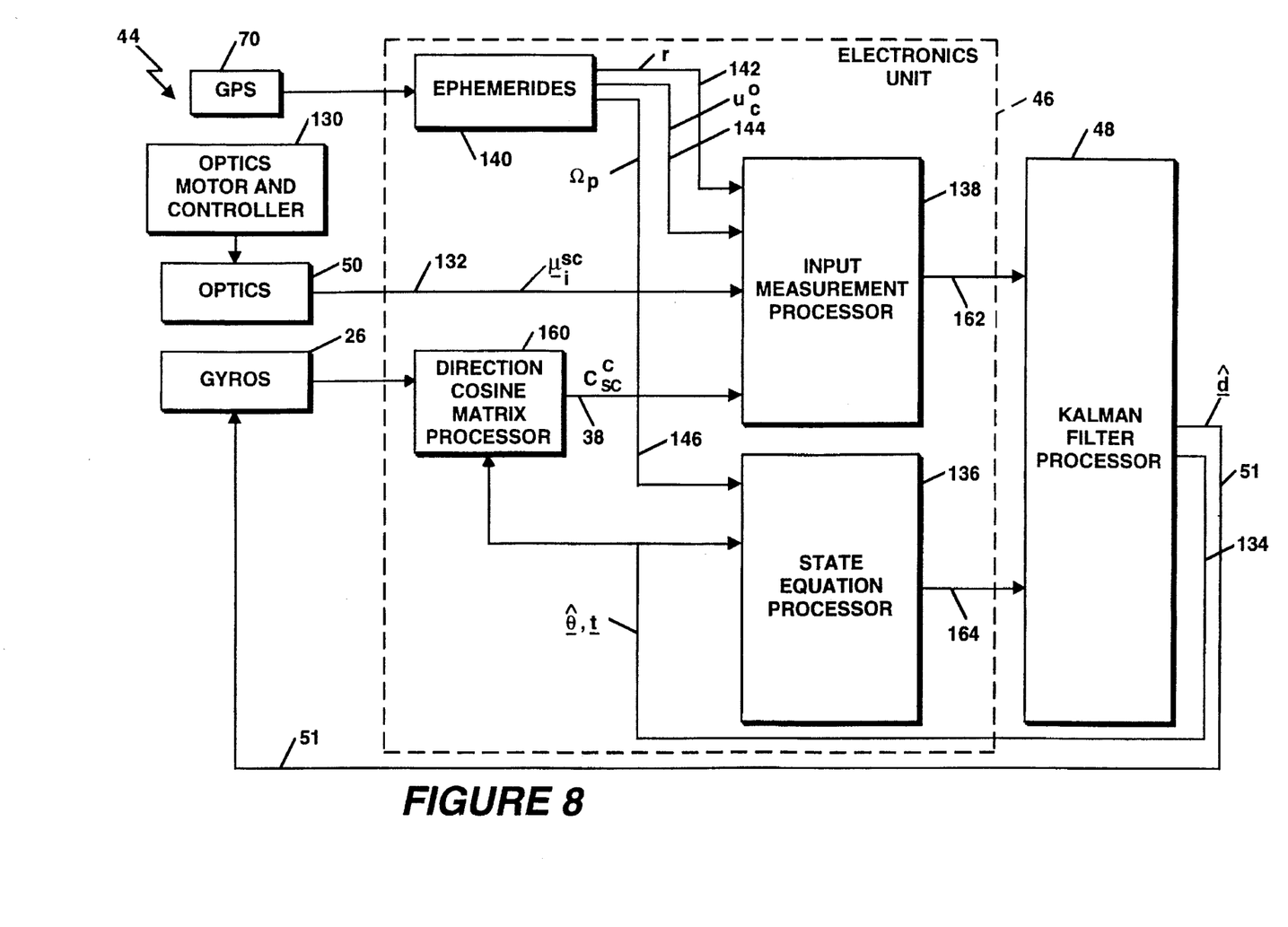
FIG. 8 is a block diagram of the attitude sensing apparatus of FIG. 4.

Referring now to FIG. 8, the implementation of the Kalman optimal estimating filter 48 (FIG. 4) will be described. Recall from FIG. 4 that the input sensors 44 include GPS receiver 70, strap-down gyroscopes 26, and optical assembly 50. Here, the Earth's horizon and Sun detecting optics 50 are shown by a single box 50 and additionally a motor and controller 130 for controlling the position of the optics, such as mirrors 60 and 90, is shown. Kalman filter 48 has as its main purpose to estimate the misalignment angles between the spacecraft frame of reference (hereinafter the SC frame of reference) and the computed orbital frame of reference (hereinafter the C frame of reference). With this angular misalignment information, the Kalman filter 48 continuously updates the attitude of the satellite 10 in order to correct errors resulting from drift experienced by the gyroscopes 26.

More particularly, the electronics unit 46 of FIG. 4 includes an ephemeride table 140, a state equation processor 136, an input measurement processor 138, and a direction cosine matrix processor 160. Output signals 164, 162 of the state equation processor 136 and the input measurement processor 138, respectively, are provided to the Kalman filter 48 which in turn, provides an output vector including feedback signals 51, 134. The first feedback signal 51 is coupled to the gyroscopes 26 and represents a set of alignment commands corresponding to the orthogonal axes of the gyroscopes 26 and the second feedback signal 134 is coupled to the direction cosine matrix processor 160 and the state equation processor 136 and represents the compensation commands for correcting the direction cosine matrix.

In view of the above discussion of the detections by the optics 50, it is apparent that the output signal $\mu_i^{SC}$ on line 132 represents a detection of either the Sun or the Earth. That is, optics output signal 132 is a unit vector in spacecraft coordinates from the line of sight of the satellite 10 to the edge of either the Sun or Earth at time $t_i$.

The gyroscopes 26 are used to compute $C_{SC}^c$ 38 which represents an estimate of the attitude of the satellite 10 and is referred to as the direction cosine matrix (DCM). More particularly, the direction cosine matrix 38 denotes a transformation from spacecraft coordinates SC to computed orbital coordinates C.

The input measurement processor 138 receives the spacecraft coordinate unit vector signal $\mu_i^{SC}$ on line 132 and the direction cosine matrix $C_{SC}^c$ on line 38. The unit vector 132 can be estimated in the orbital frame of reference by:

$$\hat{\mu}_i^o = C_{SC}^c \mu_i^{SC} \tag{1}$$

The transformation from SC coordinates to orbital coordinates can be decomposed into the following:

$$C_{SC}^c = C_O^c C_{SC}^o \tag{2}$$

where:

$$C_O^c = [I + [\underline{\theta}X]] \tag{3}$$

where I is the unit matrix, $[\underline{\theta}X]$ is the skew symmetric matrix of small angle vector $\underline{\theta}$, and the three components of $\theta$ are the small angle errors between the inertial measurement unit computed frame C and the true orbital frame. The unit vector given by equation (1) above may also be represented as follows:

$$\hat{\mu}_i^o = [I + [\underline{\theta}X]]\mu_i^o = \mu_i^o + \underline{\theta} \times \mu_i^o \tag{4}$$

which can further be approximated as:

$$\hat{\mu} \cong \mu_i^o + \underline{\theta} \times \hat{\mu}_i^o \tag{5}$$

so that:

$$\mu_i^o = \hat{\mu}_i^o - \underline{\theta} \times \hat{\mu}_i^o \tag{6}$$

Additionally, the input measurement processor 138 receives signals 142, 144 from the ephemerides table 140, the former representing the apparent radius of the disk whose point on its 8 limb is being measured by the optics 50 (i.e., the disk being the Sun) and the latter $\mu_c^o$ representing the unit vector in the orbital frame from the line of sight of the satellite 10 to the center of the Earth or the Sun disk obtained from ephemeris data. More particularly, the way in which the radius of the disk is determined by the ephemeride data is with the recognition that:

$$\mu_i^o \cdot \mu_c^o = \frac{1}{\sqrt{1+r^2}} \tag{7}$$

By substituting equation (7) into equation (6) above, the universal measurement equation for the Kalman filter 48 is given by:

$$(\underline{\theta} \times \hat{\mu}_i^o) \cdot \mu_c^o = \hat{\mu}_i^o \cdot \mu_c^o - \frac{1}{\sqrt{1+r^2}} \tag{8}$$

Note that ephemeris data is used to obtain $\mu_c^o$ and r and optics used to measure $\hat{\mu}_i^{SC}$.

The state equation processor 136 receives, in addition to the feedback signal 134 from the output of the Kalman filter 48, an output signal 146 from the ephemeride table 140. Signal 146 represents the orbital pitch rate of the satellite 10 as determined from GPS ephemeride estimates. The state equations of the Kalman filter 48 are as follows:

$$\theta x = dx + tx \tag{9}$$

$$\theta y = -\Omega p \theta z + dy + ty \tag{10}$$

$$\theta z = \Omega p \theta y + dz + tz \tag{11}$$

$$d\dot{x} = \beta dx + \omega_x \tag{12}$$

$$d\dot{y} = \beta dy + \omega_y \tag{13}$$

$$d\dot{z} = \beta dz + \omega_z \tag{14}$$

where $\beta$ is a Gauss-Markov parameter and $\omega_x$, $\omega_y$, and $\omega_z$ are white noise random processes, tx, ty, and tz are the alignment commands, dx, dy, and dz are the inertial measurement unit drifts, and $\Omega_p$ is equal to the orbital pitch rate from GPS ephemeride data.

Having described the preferred embodiments of the invention, it will be apparent to one of skill in the art that other embodiments incorporating their concepts may be used. Accordingly, the invention should be limited only by the spirit and scope of the appended claims.

We claim:

1. An attitude sensing system for a spacecraft comprising:
   a satellite receiver for providing a receiver output signal in response to satellite generated signals;
   an inertial measurement unit for providing a direction cosine matrix representing the attitude of said spacecraft in inertial space with respect to a yaw axis, a pitch axis, and a roll axis defining a frame of reference of said system;
   an optical assembly providing an optical assembly output signal, said optical assembly including a sensor array for providing a representation of an image focused on said sensor array; and
   a digital filter, responsive to said receiver output signal, said direction cosine matrix, and said optical assembly output signal, for providing an output vector for correcting the attitude of said spacecraft.

2. The attitude sensing system recited in claim 1 wherein said output vector further includes a set of alignment commands corresponding to errors in said attitude of said system with respect to said yaw axis, pitch axis, and roll axis for adjusting said direction cosine matrix.

3. The attitude sensing system recited in claim 1 wherein said satellite receiver is a GPS receiver.

4. The attitude sensing system recited in claim 2 wherein said optical assembly provides a first signal to said digital filter representing said image focused on said sensor array in response to the horizon of the Earth, wherein said receiver output signal and said first optical assembly signal are used to update the attitude of said system with respect to the pitch axis.

5. The attitude sensing system recited in claim 4 wherein said first optical assembly signal comprises a pair of signals representing detections of the Earth's horizon both fore and aft of the system, said pair of signals used to compute a local vertical vector, wherein said update of the attitude of the system about the pitch axis is provided by adjusting said local vertical vector in accordance with a pitch rate deviation determined with an oblate Earth model and said receiver output signal.

6. The attitude sensing system recited in claim 3 wherein said optical assembly provides a second signal to said digital filter representing said image focused on said sensor array in response to a detection of the Sun, wherein said second optical assembly signal is used to update the direction cosine matrix with respect to the yaw and roll axes.

7. The attitude sensing system recited in claim 4 wherein said second optical assembly signal comprises four signals, two of which represent detections of the edge of the Sun along a vertical scan axis and two of which represent detections of the edge of the Sun along an azimuth scan axis, wherein said four signals are used to compute the location of the center of the Sun.

8. The attitude sensing system recited in claim 1 wherein said digital filter is a Kalman filter.

9. The attitude sensing system recited in claim 1 wherein said inertial measurement unit comprises three gyros oriented along three mutually orthogonal axes.

10. A method for sensing and updating the attitude of an Earth-orbiting vessel, with the boresight of the vessel defining a yaw axis, the axis tangential to the orbit of the vessel defining a roll axis, and the axis orthogonal to the plane of the orbit defining a pitch axis, said method comprising the steps of:

ascertaining horizon detections including the Earth's horizon both fore and aft of the vessel and using said horizon detections to compute a local vertical vector;

determining the attitude of said vessel in response to said local vertical vector and gyrocompassing in accordance with an orbital rate derived from GPS ephemerides; and periodically correcting the attitude of said vessel with respect to the roll and yaw axes by sensing the location of the Sun relative to the vessel.

11. The method recited in claim 10 further comprising the step of periodically updating the attitude with respect to the pitch axis by compensating said local vertical vector in accordance with a pitch deviation value determined with an oblate Earth model and a GPS position signal.

12. The method recited in claim 10 further comprising the step of continuously updating said attitude with an inertial measurement unit.

13. An attitude sensing system for a spacecraft comprising:

an optical assembly for measuring a line of sight of said system to the Sun and for measuring a line of sight of said system to a point on the limb of the Sun;

a GPS receiver for providing an output signal representing the apparent radius of the Sun; and a Kalman filter providing an estimate of attitude in response to said GPS derived apparent radius signal, said measurement of said line of sight to the Sun, and said measurement of said line of sight to said point on the limb of the Sun.

* * * * *

UNITED STATES PATENT AND TRADEMARK OFFICE
CERTIFICATE OF CORRECTION

PATENT NO. : 5,546,309
DATED : August 13, 1996
INVENTOR(S) : William M. Johnson et al.

It is certified that error appears in the above-identified patent and that said Letters Patent is hereby corrected as shown below:

Column 3, line 53, "$\omega \triangleq |\underline{\omega}_p|$" should read -- $\omega_p \triangleq |\underline{\omega}_p|$ --.

Column 9, equation 5, "$\hat{\underline{\mu}} \cong \underline{\mu}_i^o + \underline{\theta} \times \hat{\underline{\mu}}_i^o$" should read -- $\hat{\underline{\mu}}_i^o \cong \underline{\mu}_i^o + \underline{\theta} \times \hat{\underline{\mu}}_i^o$ --.

Column 10, line 4, "on its 8 limb" should read -- on its limb --.

Column 10, equation 12, " $\dot{dx} = \beta dx + \omega_x$ " should read -- $\dot{dx} = \beta dx + \omega_x$ --.

Column 10, equation 13, " $\dot{dy} = \beta dy + \omega_y$ " should read -- $\dot{dy} = \beta dy + \omega_y$ --.

UNITED STATES PATENT AND TRADEMARK OFFICE
CERTIFICATE OF CORRECTION

PATENT NO. : 5,546,309
DATED : August 13, 1996
INVENTOR(S) : William M. Johnson et al.

It is certified that error appears in the above-identified patent and that said Letters Patent is hereby corrected as shown below:

Column 10, equation 14, " $\dot{dz} = \beta dz + \omega_z$ " should read -- $\dot{dz} = \beta dz + \omega_z$ --.

Signed and Sealed this

Seventeenth Day of February, 1998

Attest:

BRUCE LEHMAN

Attesting Officer

Commissioner of Patents and Trademarks